US012160881B2

(12) United States Patent
Venkata et al.

(10) Patent No.: US 12,160,881 B2
(45) Date of Patent: Dec. 3, 2024

(54) UPLINK POWER-SHARING IN WIRELESS COMMUNICATION DEVICES EMPLOYING MULTIPLE RADIO ACCESS TECHNOLOGIES

(71) Applicant: GOOGLE LLC, Mountain View, CA (US)

(72) Inventors: Madhusudan Kinthada Venkata, San Diego, CA (US); Runkun Mao, Santa Clara, CA (US); Srinivas Vangaru, Dublin, CA (US); Siddharth Ray, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 144 days.

(21) Appl. No.: 17/005,706

(22) Filed: Aug. 28, 2020

(65) Prior Publication Data

US 2022/0070888 A1 Mar. 3, 2022

(51) Int. Cl.
*H04W 72/04* (2023.01)
*H04W 52/36* (2009.01)
*H04W 72/044* (2023.01)
*H04W 72/50* (2023.01)
*H04W 72/53* (2023.01)
*H04W 72/56* (2023.01)

(52) U.S. Cl.
CPC ....... *H04W 72/535* (2023.01); *H04W 52/367* (2013.01); *H04W 72/0473* (2013.01); *H04W 72/53* (2023.01); *H04W 72/56* (2023.01)

(58) Field of Classification Search
None
See application file for complete search history.

(56) References Cited

U.S. PATENT DOCUMENTS

2019/0357264 A1 11/2019 Yi et al.

OTHER PUBLICATIONS

GTI, "GTI Sub-6GHz 5G Device White Paper", version 4, Jun. 6, 2020, 116 pages; accessed on Aug. 27, 2020 at <<http://www.gtigroup.org/Resources/rep/2019-07-05/13839.html>>.

*Primary Examiner* — Willie J Daniel, Jr.

(57) ABSTRACT

A user equipment (UE) employing different radio access technologies (RATs) concurrently provides the UE the opportunity to connect with different RAT-based base stations and concurrently transmit data thereto. A power-sharing control mechanism provides for sharing and allocating transmit power to multiple active RATs at the UE based on a priority designation of the data type associated with transmissions scheduled for each of the multiple active RATs. The power-sharing control mechanism provides efficient transmit power sharing between multiple transmit active RATs such that allocation of power to one RAT does not adversely affect the performance or coverage of the remaining RATs.

21 Claims, 3 Drawing Sheets

UPLINK POWER-SHARING IN WIRELESS COMMUNICATION DEVICES EMPLOYING MULTIPLE RADIO ACCESS TECHNOLOGIES

BACKGROUND

Cellular phones and other mobile user equipment (UE) often are configured with multiple radio access technologies (RATs). This configuration allows the UE to successively or concurrently connect to different radio access networks (RANs) or a single RAN employing multiple RATs. For example, a configured UE can concurrently connect to a base station employing a first RAT and a base station employing a second RAT for simultaneously transmitting or receiving data utilizing different RATs. However, when multiple RAT uplink signals are transmitted simultaneously by the UE, the combined transmit power utilized by both uplink signals overlap in time and thus may exceed the total maximum transmit power allowed for the UE.

SUMMARY OF EMBODIMENTS

In accordance with one aspect, a method for managing transmit power for multiple radio access technologies (RATs) at a user equipment (UE) includes determining whether a first scheduled transmission using a first RAT of the UE overlaps in time with at least a second scheduled transmission using at least a second RAT of the UE. The method further includes, responsive to the first and second scheduled transmissions overlapping in time, allocating transmit power to the first RAT and the second RAT based on a first data type of a first set of data associated with the first scheduled transmission and a second data type of a second set of data associated the second scheduled transmission. In some embodiments, the first RAT is a Fourth Generation Long-Term Evolution RAT and the second RAT is a Fifth Generation New Radio RAT.

In some implementations, allocating transmit power to the first RAT and the second RAT includes determining whether at least one of the first data type and the second data type is designated as a priority data type. Responsive to determining that at least one of the first data type and the second data type is designated as a priority data type, transmit power is allocated to the first RAT and the second RAT according to a power transmit priority associated with the at least one of the first data type and the second data type. In some embodiment, if the first data type is designated as a lower priority than the second data type, transmit power is allocated to the first RAT and the second RAT by determining whether the second data type is designated as a higher priority than the first data type. Responsive to the second data type being designated as a higher priority, a first transmit power required by the second RAT is determined. The determined first transmit power is then allocated to the second RAT. A second transmit power available for the first RAT is determined based on the first transmit power allocated to the second RAT. The determined second transmit power is allocated to the first RAT.

In some implementations, allocating transmit power to the first RAT and the second RAT includes determining whether the first data type is designated as a higher priority than the second data type. Responsive to the first data type being designated as a higher priority, a first transmit power required by the first RAT is determined. The determined first transmit power is then allocated to the first RAT. A second transmit power available for the second RAT is determined based on the first transmit power allocated to the first RAT. The determined second transmit power is allocated to the second RAT. In some embodiments, the first transmit power is determined based on a maximum allowed transmit power for the UE and a maximum allowed transmit power for the first RAT, and the second transmit power is determined based on a difference between the first transmit power and the maximum allowed transmit power for the UE.

In some implementations, allocating transmit power to the first RAT and the second RAT includes determining whether the second data type is designated as a higher priority than the first data type. Responsive to the second data type being designated as a higher priority, a first transmit power required by the second RAT is determined. The determined first transmit power is allocated to the second RAT. A second transmit power available for the first RAT is determined based on the first transmit power allocated to the second RAT. The determined second transmit power is allocated to the first RAT. In some embodiments, the first transmit power is determined based on a maximum allowed transmit power for the UE and a maximum allowed transmit power for the second RAT, and the second transmit power is determined based on a difference between the first transmit power and the maximum allowed transmit power for the UE In some implementations, allocating transmit power to the first RAT and the second RAT includes determining that the first data type and the second data type are designated as non-priority data types. Responsive to the first and second data types being designated as non-priority data types, transmit power to the first RAT and the second RAT is allocated according to an equal power-sharing policy. In some embodiments, allocating transmit power to the first RAT and the second RAT according to the equal power-sharing policy includes equally allocating a same specified amount of transmit power to each of the first RAT and the second RAT based on a maximum transmit power set for the UE. Allocating transmit power to first RAT and the second RAT according to the equal power-sharing policy, in some embodiments, is further responsive to the first RAT and the second RAT being employed in a split bearer configuration. Allocating transmit power to the first RAT and the second RAT according to the equal power-sharing policy, in some embodiments, includes determining that only the first scheduled transmission includes data to be transmitted. Responsive to only the first scheduled transmission including data to be transmitted, a total amount of transmit power required for transmitting the first scheduled transmission is allocated to the first RAT, based on a maximum transmit power set for the UE. In other embodiments, allocating transmit power to the first RAT and the second RAT according to the equal power-sharing policy includes determining that only the second scheduled transmission comprises data to be transmitted. Responsive to only the second scheduled transmission comprising data to be transmitted, allocating, based on a maximum transmit power set for the UE, a total amount of transmit power to the second RAT required for transmitting the second scheduled transmission.

In some implementations, allocating transmit power to the first RAT and the second RAT includes determining that the first data type and the second data type are designated as non-priority data types. Responsive to the first and second data types being designated as non-priority data types, transmit power to the first RAT and the second RAT is allocated according to closed loop power control requirements of the first RAT and the second RAT, respectively. In some embodiments, allocating transmit power to the first RAT further includes allocating the transmit power to the first RAT based on a maximum transmit power set for the UE and a ratio of a first transmit power required for the first scheduled transmission to a second transmit power required for the second scheduled transmission. Allocating transmit power to the second RAT, in some embodiments, further includes allocating the transmit power to the second RAT based on a maximum transmit power set for the UE and a ratio of a first transmit power required for the second scheduled transmission to a second transmit power required for the first scheduled transmission.

In accordance with another aspect, a user equipment includes one or more radio frequency (RF) modems configured to wirelessly communicate with at least one mobile network operator and implementing at least a first radio access technology (RAT) and a second RAT, a processor coupled to the one or more RF modems. The user equipment further includes at least one memory storing executable instructions, the executable instructions configured to manipulate at least one of the processor and the one or more RF modems to determine whether a first scheduled transmission using the first RAT overlaps in time with at least a second scheduled transmission using at least the second RAT, and responsive to the first and second scheduled transmissions overlapping in time, allocate transmit power to the first RAT and the second RAT based on a first data type of a first set of data associated with the first scheduled transmission and a second data type of a second set of data associated the second scheduled transmission. In some embodiments, the executable instructions further comprise executable instructions to manipulate at least one of the processor or the one or more RF modems to determine whether at least one of the first data type and the second data type is designated as a priority data type, and responsive to a determination that at least one of the first data type and the second data type is designated as a priority data type, allocate transmit power to the first RAT and the second RAT according to a power transmit priority associated with the at least one of the first data type and the second data type.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
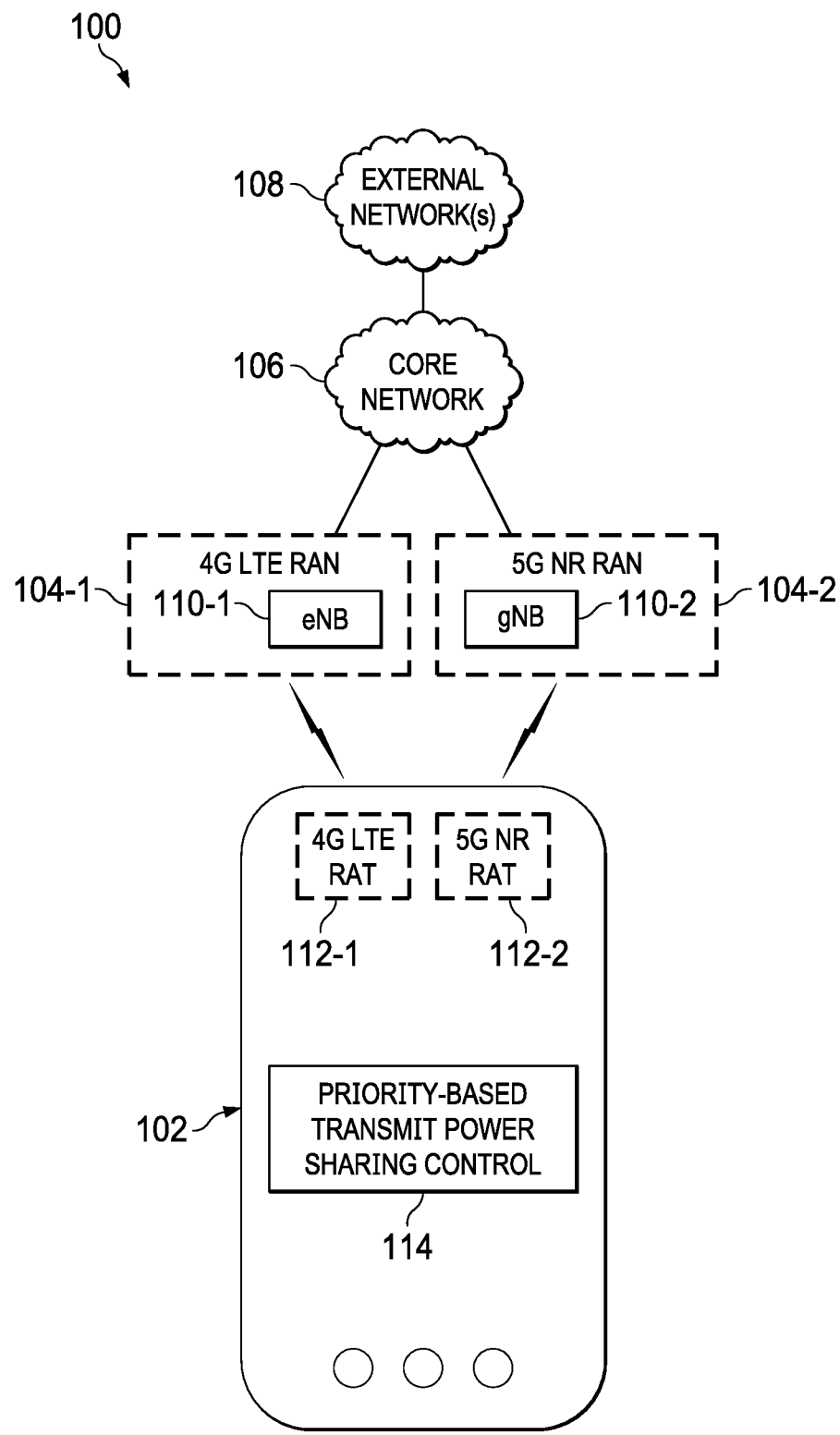
FIG. 1 is a block diagram illustrating a mobile cellular system having a UE employing a data priority-based transmit power-sharing mechanism in accordance with some embodiments.

The ability to employ multiple different RATs concurrently at a multimode UE provides the UE the opportunity to simultaneously access multiple services provided within a mobile cellular network. Managing the transmit power between different RATs when in concurrent use facilitates peak performance of the UE while meeting power regulations. For example, uplink transmit power needs to be managed in a way that ensures the combined power of simultaneous uplink transmissions utilizing different RATs does not exceed the maximum transmit power allowed for the UE. However, current mechanisms for sharing transmit power between simultaneous uplink transmissions typically result in one RAT over-utilizing the allocated power while leaving the remaining RATs with insufficient power. Allocating insufficient power for transmission is problematic since, for example, a RAT with insufficient power may be unable to respond to communications from a corresponding base station, especially as the UE moves toward the edge of a cell. Insufficient power reduces the coverage and performance of the associated RAT.

The present disclosure describes embodiments of systems and methods for a data priority-based power-sharing mechanism that overcomes various problems associated with sharing transmit power across multiple RATs at a UE. As described in greater detail below, the data priority-based power-sharing mechanism of one or more embodiments dynamically allocates the maximum allowed transmit power of a UE between different RATs based on the priority or type of data being transmitted by the RATs. For example, the UE comprises a first RAT and a second different RAT, the first RAT is given priority for transmit power if the first RAT is transmitting higher priority data than the second RAT. If the second RAT is transmitting higher priority data than the first RAT, the second RAT is given priority for transmit power. If a split bearer is configured (that is, a configuration in which data traffic is routed to different bearers) and both the first RAT and the second RAT are transmitting the same type of data, the maximum transmit power available for the UE is equally shared between the first RAT and the second RAT. However, if the first RAT and the second RAT are transmitting non-priority data and a split bearer is not configured, the maximum transmit power is split between the first RAT and the second RAT according to their respective closed-loop power control (CLPC) requirements. The data priority-based power-sharing mechanism of one or more embodiments helps to ensure that power is allocated to the RATs efficiently and fairly such that power is allocated to one RAT without excessively adversely impacting the other RAT. This approach ensures coverage and performance of the RATs are not adversely affected by power-sharing between the RATs.

In at least one embodiment, a UE performs a method for managing transmit power for multiple RATs at the UE. For example, the UE determines whether a first scheduled transmission for a first RAT of the UE overlaps in time with at least a second scheduled transmission for at least a second RAT of the UE. Then, responsive to the first and second scheduled transmissions overlapping in time, the UE allocates transmit power to the first RAT and the second RAT based on a first data type of a first set of data associated with the first scheduled transmission and a second data type of a second set of data associated with the second scheduled transmission.

For ease of illustration, the following techniques are described in an example context in which a single RAN and one or more UEs implement multiple RATs that include at least a first RAT compliant with a Fourth Generation (4G) Long-Term Evolution (LTE) standard (e.g., Third Generation Partnership Project (3GPP) Release 8, 3GPP Release 9, etc.) (hereinafter, "4G" or "4G standard") and a second RAT compliant with a Fifth Generation (5G) New Radio (NR)

standard (e.g., 3GPP Release 15, 3GPP Release 16, etc.) (hereinafter, "5G NR" or "5G NR standard"). In this example context, a UE supporting multiple RATs can concurrently connect to different RAT components within the RAN. For example, the UE can concurrently connect to a 4G LTE base station and a 5G NR base station within the same RAN. As such, the power-sharing management between a 4G LTE RAT and a 5G NR RAT at a UE effectively illustrate aspects of the techniques described below. However, it should be understood that the present disclosure is not limited to a 4G LTE RAT/5G NR RAT configuration, but rather the techniques described herein can be applied to any combination of different RATs employed at the UE and the RAN and which exhibit at least some disparity between the technologies. Accordingly, reference herein to a 4G LTE RAT applies equally to a first RAT of a UE and the RAN, while reference to a 5G NR RAT applies equally to a second RAT of the UE and the RAN.

It should also be understood that the present disclosure is not limited to any specific network configurations or architectures described herein for allowing a UE to simultaneously transmit data to different RANs (or the same RAN) utilizing different RATs, but rather techniques described herein can be applied to any configuration of RANs where the UE can transmit data on one or more uplink channels concurrently utilizing multiple different RATs. Moreover, various references are made herein to transmit (or transmission) power. Unless otherwise noted, transmit/transmission power refers to the power level at which the transmitter of a UE transmits a wireless signal on an uplink channel to a base station. Also, unless otherwise noted, "concurrent" actions, events, operations, etc. include "simultaneous" actions, events, operations, etc. as well.

FIG. 1 illustrates a mobile cellular system 100 utilizing data priority-based power-sharing control in accordance with some embodiments. As shown in FIG. 1, the mobile cellular system 100 includes a user equipment (UE) 102, one or more radio access networks (RANs) 104, and a core network 106. FIG. 1 further shows that one or more external networks 108, such as the Internet, are coupled to the mobile cellular system 100 via the core network 106. It should be understood that the mobile cellular system 100 may include additional components not shown in FIG. 1.

The UE 102 can include any of a variety of wireless communication devices, such as a cellular phone, a cellular-enabled tablet computer or cellular-enabled notebook computer, a cellular-enabled wearable device, an automobile or other vehicle employing cellular services (e.g., for navigation, provision of entertainment services, in-vehicle mobile hotspots, etc.), and the like. The RANs 104, in this example, include a RAN 104-1 accessible using a 4G LTE RAT and a RAN 104-2 accessible using a 5G NR RAT (and thus referred to herein as "4G LTE RAN 104-1" and "5G NR RAN 104-2", respectively). Each RAN 104 is connected to one or more other RANs 104 via at least the core network 106. Each RAN 104-1, 104-2 includes one or more base stations 110 operable to wirelessly communicate with UEs within signal range, with each or a combination of the base stations 110 defining a single "cell" of coverage for the RAN 104.

FIG. 1 depicts a single base station 110 in each RAN 104, but it will be appreciated that a typical implementation of a RAN 104 includes a number of base stations 110. Consistent with the terminology employed by the 4G LTE standard, a base station 110 implementing a 4G LTE RAT is referred to herein as "extended NodeB 110-1" or "eNB 110-1". Likewise, consistent with the terminology employed by the 5G NR standard, a base station 110 implementing a 5G NR RAT is referred to herein as "5G NodeB 110-2" or "gNB 110-2". As is well known in the art, the base stations 110 operate as an "air interface" to establish radio frequency (RF) wireless connections with UEs. These wireless connections (or "links") then serve as data and voice paths between the UEs and the core network 106, which is coupled to one or more of the external networks 108, for providing various services to the UEs. Examples of these services include voice services via circuit-switched networks or packet-switched networks, messaging services such as simple messaging service (SMS) or multimedia messaging service (MMS), multimedia content delivery, presence services, and the like.

The UE 102, in at least one embodiment, is a multimode UE that employs multiple RATs 112, either concurrently or successively, to access one or more services of the RAN(s) 104 in support of software applications executing at the UE 102. In the example embodiment of FIG. 1, the UE 102 supports a first RAT 112-1 enabling the UE 102 to connect with the eNB 110-1 and a second RAT 112-2 enabling the UE 102 to connect with the gNB 110-2. Accordingly, the first RAT 112-1 and the second RAT 112-2 are also referred to herein as "4G LTE RAT 112-1" and "5G NR RAT 112-2", respectively. The UE 102 can respectively utilize the 4G LTE RAT 112-1 and second 5G NR RAT 112-2 to concurrently or successively connect to the eNB 110-1 and gNB 110-2. When concurrently connected to the eNB 110-1 and gNB 110-2, the UE 102 can transmit and/or receive data utilizing resources provided by at least one of the eNB 110-1 or gNB 110-2 while concurrently maintaining the connection to both of the eNB 110-1 and gNB 110-2.

One example of a configuration/architecture that can be implemented by the mobile cellular system 100 for allowing the UE 102 to simultaneously utilize the 4G LTE RAT 112-1 and the 5G NR RAT 112-2 is the 3GPP 5G E-UTRAN New Radio-Dual Connectivity ("EN-DC") architecture, also referred to "5G Non-Standalone (NSA)". EN-DC enables the 102 UE to simultaneously transmit and receive data on multiple component carriers from two cell groups, where one cell group provides 4G LTE access, and the other cell group provides 5G NR access. In EN-DC, a 4G LTE RAN 104 comprises both 4G LTE eNBs 110-1 and 5G NR gNBs 110-2. The eNB 110-1 acts as an anchor or master base station that controls the gNB 110-2, which is considered the supplement or secondary base station. The gNB 110-2 directly connects to the 4G LTE cell and is controlled by the eNB 110-1. The gNB 110-2 is connected to the 4G LTE core network 106 (Evolved Packet Core (EPC)) at the data plane level but does not connect to the Mobility Management Entity (MME). The MME exclusively communicates with the eNB 110-1. The UE 102 can be connected to the eNB 110-1 and a gNB 110-2 or the eNB 110-1 for the control plane and the gNB 110-2 for the user plane.

In an EN-DC configuration, when the UE 102 is to exchange data, the UE 102 first attaches to the 4G LTE network and signals the core network 106 that it supports dual connectivity to 4G LTE and 5G NR networks. During this procedure, the eNB 110-1 communicates with the MME within the core network 106 to authenticate the UE 102 and determine whether the UE 102 is authorized for dual connectivity. The 4G LTE default bearer is also established during this procedure. The eNB 110-1 instructs the UE 102 to measure the signal quality of nearby gNBs 110-2 and report the signal quality measurements. The UE 102 reports the gNB measurements back to the eNB 110-1. If the measurements indicate good signal quality for a 5G bearer, the eNB 110-1 sends an Addition Request to the corresponding gNB 110-2 requesting a 5G bearer. The gNB 110-2 receives the request from the eNB 110-1 and assigns 5G radio resources to the session. The gNB 110-2 also sends an Addition Request Acknowledgment message, which carries the 5G bearer configuration, back to the eNB 110-1. The eNB 110-1 signals the 5G bearer configuration to the UE 102 via an LTE Radio Resource Control (RRC) Connection Reconfiguration message. The UE 102 accepts the reconfiguration request and sends an RRC Connection Reconfiguration Complete message back to the eNB 110-1. The eNB 110-1 notifies the gNB 110-2 that the UE 102 has accepted the reconfiguration request adding a 5G carrier in dual-connectivity mode. The UE 102 then accesses the 5G network using a random-access procedure, which is handled by the gNB 110-2. The UE 102 is then able to maintain simultaneous dual connectivity to the 4G LTE eNB 110-1 and the 5G NR gNB 110-2. Therefore, when the UE 102 is operating with EN-DC, the UE 102 may transmit both a 4G LTE uplink signal and a 5G NR uplink signal simultaneously. It should be understood that EN-DC (and related variants, e.g., MR-DC and NE-DC) is only one example configuration/architecture applicable to the present disclosure. Embodiments described herein apply to any network configuration/architecture that enables a UE to transmit data utilizing multiple different RATs concurrently.

Although a UE 102 may be able to concurrently transmit and receive data utilizing multiple different RATs 112-1, 112-2, the transmit power of the UE 102 may be restricted or limited to a maximum amount. For example, current 3GPP standards define a maximum transmit power (Pmax) limit of 23 decibels-per-milliwatt (dBm) for a UE regardless of cell size. Therefore, if the UE 102 is concurrently utilizing two or more of RATs 112-1, 112-2, the transmit power of the UE 102 needs to be shared between the RATs 112-1, 112-2 to ensure the maximum transmit power is not exceeded. Accordingly, in at least one embodiment, one or more components of the mobile cellular system 100 employ a data priority-based transmit power-sharing control mechanism 114 to manage power-sharing at the UE 102 between RATs 112-1, 112-2 based on the type or priority of data being transmitted by each RAT 112-1, 112-2. The data priority-based transmit power control mechanism 114 ensures that power is dynamically allocated to the RATs efficiently and fairly such that power is allocated to one RAT without adversely impacting the other RAT. This approach helps to ensure coverage and performance of the RATs are not adversely affected by power-sharing between the RATs.

Figure 2:
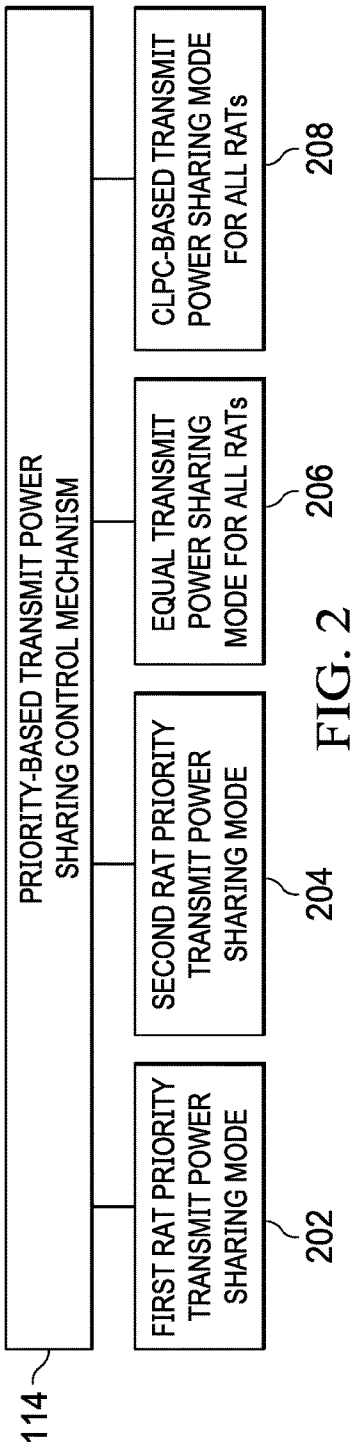
FIG. 2 is a block diagram illustrating example modes of the data priority-based transmit power-sharing mechanism employed by the UE of FIG. 1 in accordance with some embodiments.

FIG. 2 illustrates various example modes employed singularly or in various combinations by the UE 102 as part of the data priority-based transmit power-sharing control mechanism 114 in accordance with some embodiments. Each of these modes is discussed in greater detail below with respect to FIG. 4. One such mode includes a first RAT 112-1 priority mode 202 in which a first RAT 112-1 uplink transmission is given transmit power priority over a second RAT 112-2 uplink transmission when the first RAT 112-1 uplink transmission comprises data designated as priority data. Another mode includes a second RAT 112-2 priority mode 204 in which a second RAT 112-2 uplink transmission is given transmit power priority over a first RAT 112-1 uplink transmission when the second RAT 112-2 uplink transmission comprises data designated as priority data. Yet another mode includes an equal power-sharing mode 206 in which a first RAT 112-1 uplink transmission and a second RAT 112-2 uplink transmission equally share the maximum allowed transmit power when a split bearer is configured for the first RAT 112-1 and the second RAT 112-2, and each uplink transmission carries the same type of data such as data designated as non-priority data or data type. A further mode includes a closed-loop power control (CLPC)-based sharing mode 208 in which power is split between the first RAT 112-1 and the second RAT 112-2 according to their respective CLPC requirements.

Figure 3:
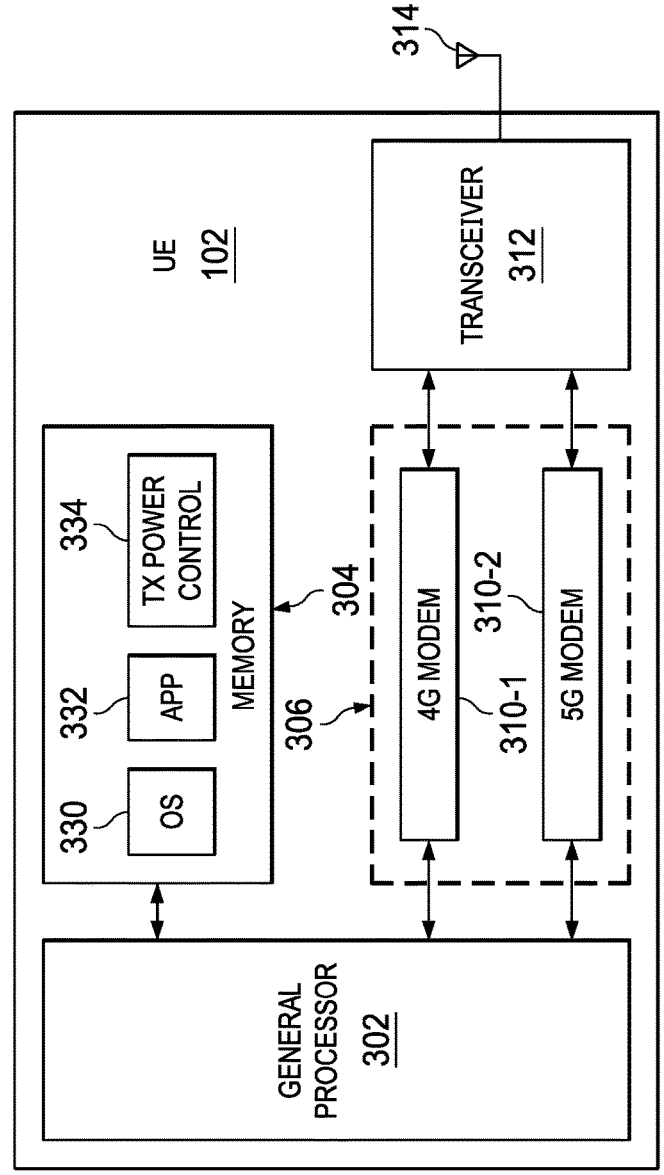
FIG. 3 is a block diagram illustrating an example implementation of the UE of FIG. 1 in accordance with some embodiments.

FIG. 3 illustrates one example hardware configuration for the UE 102 implementing the priority-based transmit power-sharing control mechanism 114 in accordance with some embodiments. In the depicted example, the UE 102 includes one or more central processing units (CPUs) or other processors 302, system storage/memory 304, and one or more radio resources 306. The processor(s) 302 may be a single-core processor or a multiple-core processor. The storage 304 may include any suitable memory or storage device such as random-access memory (RAM), static RAM (SRAM), dynamic RAM (DRAM), non-volatile RAM (NVRAM), read-only memory (ROM), Flash memory, a combination thereof, or the like to store device data of the UE 102.

The one or more radio resources 306 include at least one modem 310, at least one transceiver 312, and at least one antenna array 314 suitable for RF signaling and signal processing in one or more frequency bands typically associated with cellular RATs. In the illustrated embodiment, the 4G LTE RAT 112-1 and the 5G NR LTE RAT 112-2 share the same radio. Thus, the radio resource 306 includes a 4G modem 310-1 for operating the transceiver 312 and the one or more antenna arrays 314 at frequency bands and with signal structure and protocol in accordance with at least one 4G LTE standard, as well as a 5G NR modem 310-2 for operating the transceiver 312 and the one or more antenna arrays 314 at frequency bands and with signal structure and protocol in accordance with at least one 5G NR standard. In other embodiments, the 4G LTE RAT 112-1 and 5G NR RAT 112-2 each have a separate radio, and thus include one transceiver 312 and antenna array 314 for the 4G LTE RAT 112-1 and a separate transceiver 312 and antenna array 314 for the 5G NR RAT 112-2. Further, it will be appreciated that the UE 102 can include a number of additional components omitted from FIG. 3 for ease of illustration, including, for example, one or more displays, one or more touchscreens, keypads, mice, touchpads, microphones, speakers, and other user input/output devices, one or more sensors, batteries or other power sources, graphical processing units (GPUs) or other coprocessors, and the like.

As a general operational overview, the processor 302 executes executable instructions from a software stack that includes an operating system (OS) 330 (also commonly referred to as a "kernel") and one or more user software applications 332. The software stack can further include the protocol stacks executed by processors of the modems 310-1 and 310-2. The OS 330, through manipulation of the processor 302, manages the general operation of the various hardware components of the UE 102 and also to support the execution of the one or more user software applications 332. The executable instructions may represent the OS 330 and the user software application 332 typically accessed from storage 304 for execution by the processor 302. During execution, one or more processes of the OS 330 or the user software application 332 may seek to wirelessly communicate with a component in the mobile cellular system 100 (FIG. 1), such as with a server, a gateway, another UE, and the like, with these processes referred to herein as "local processes."

If a local process is seeking to use a cellular connection, the OS 330 coordinates with the radio resource to establish a cellular connection with one or both of the RANs 104-1 and 104-2 using the corresponding RAT 112. To this end, each modem 310 stores a protocol stack (not shown) storing executable instructions that, when executed by a baseband processor (not shown) of the modem 310, manipulate the baseband processor to perform various operations in accordance with a RAT protocol or other communication protocol associated with the air interface provided by the corresponding base station 110 via the transceiver 312 and antenna array 314. As is well known, such operations typically are associated with the lower-level layers of a network protocol, such as some or all of the physical, data link, and network layers, while the OS 330 and the user software application 332 support the higher-level layers of the network protocol, such as the transport, session, presentation, and application layers.

In many situations, the UE 102 can utilize two or more different RATs 112 to connect to different RAT-based base stations 110 and simultaneously transmit data to each of the base stations 110. However, the UE 102 is typically limited to a maximum transmit power. Therefore, when the UE 102 is operating both a first RAT 112-1 and a second RAT 112-2 to simultaneously transmit first and second uplink signals, the UE 102 needs to ensure the combined transmit power of both uplink signals does not exceed the maximum allowed transmit power configured for the UE 102. Therefore, to facilitate effective uplink transmit power-sharing between multiple active RATs 112, the UE 102, in at least one embodiment, includes a transmit power-sharing control stack 334 (identified as "TX POWER CONTROL 334" in FIG. 3). The transmit power-sharing control stack 334 includes executable instructions that, when executed by a component of the UE 102, such as the processor 302, another processor, the modems 310-1 and 310-2, etc., manipulate the component to provide the priority-based transmission power-sharing control mechanism 114 and related modes of operation 202 to 208 as described herein. In some embodiments, the transmit power-sharing control stack 334 is implemented as part of the OS 330 or another kernel, while in other embodiments the transmit power-sharing control stack 334 can be implemented as, for example, a driver or other software for controlling the radio resource 306. As noted above, examples of various modes utilized in accordance with the data priority-based transmission power-sharing control mechanism 114, and thus implemented by the power-sharing control mechanism 114, via the hardware components of the UE 102, are described below with reference to FIG. 4.

Figure 4:
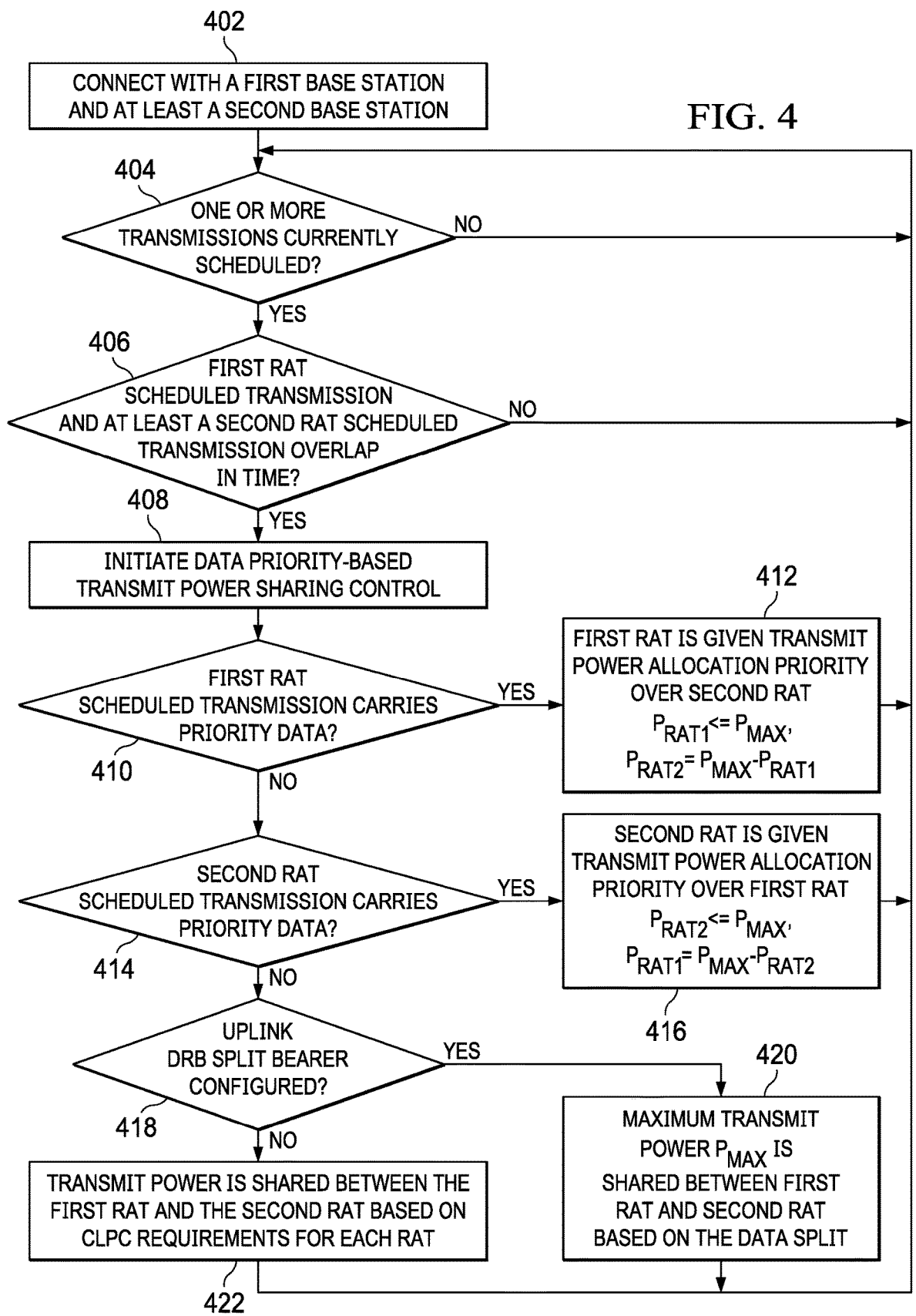
FIG. 4 is a flow chart illustrating the various example modes of the data priority-based transmit power-sharing mechanism in accordance with some embodiments.

FIG. 4 illustrates, in flow chart form, one example implementation of the data priority-based transmit power-sharing control mechanism 114 in accordance with some embodiments. In the following example, the RATs 112 of the UE are configured to transmit data utilizing one or more transmission and encoding techniques. One example of a data transmission technique is Orthogonal Frequency Division Multiplex (OFDM), as well as associated access technologies such as Orthogonal Frequency Division Multiple Access (OFDMA) and Single Carrier Frequency Divisional Multiple Access (SC-FDMA). As is known, OFDM utilizes closely spaced carriers (e.g., 15 kilohertz (kHz) in 4G LTE and 30 kHz in 5G NR) that are modulated with low-rate data, where data to be transmitted is split across all the carriers. The signals are made orthogonal to each other to avoid interference by having the carrier spacing equal to the reciprocal of the symbol period.

The data transmitted using OFDM can be modulated utilizing techniques such as Frequency Division Duplex (FDD) or Time Division Duplex (TDD). FDD utilizes separate bands to transmit uplink and downlink signals, while TDD utilizes time slots on the same frequency to transmit uplink and downlink signals. In a 4G LTE system, an FDD frame has an overall length of 10 milliseconds (ms) and comprises 10 subframes, each having a length of 1 ms. Each of the 10 subframes is divided into 2 slots having a length of 0.5 ms. A 4G LTE TDD frame also has an overall length of 10 ms but comprises two half frames. Each half frame has a length of 5 ms and is further divided into five subframes with a length of 1 ms. In a 5G NR system, a single frame structure is utilized that supports both TDD and FDD as compared to using the two different frame structures of 4G LTE. However, the overall length and slot lengths of a 5G NR frame are the same as in a 4G LTE frame.

In a multimodal implementation, the UE 102 at block 402 connects with, or attaches to, a first base station 110, such as the eNB 110-1, and a second base station 110, such as the gNB 110-2. Details regarding the connection procedures are understood by those skilled in the art and are omitted for clarity. As part of the connection procedure, at least one of the base stations 110 transmits a total maximum power limit ($P_{Max}$) to the UE 102. For example, in an EN-DC configuration, the eNB 110-1 transmits the maximum power limit, $P_{Max}$, to the UE 102. The UE 102 can also obtain a maximum power limit for the first RAT 112-1 ($P_{RAT1}$) and a maximum power limit for the second RAT 112-2 ($P_{RAT2}$). For example, in an EN-DC configuration, the eNB 110-1 transmits an LTE maximum power limit, ($P_{LTE}$) to the UE 102 while the gNB 110-2 transmits a 5G NR maximum power limit, ($P_{NR}$) to the UE 102.

The UE 102 at block 404 determines if one or more transmission slots are scheduled. If no transmission slots have been scheduled, the UE 102 continues to monitor for scheduled slots. However, if the UE 102 determines that one or more transmission slots have been scheduled, the UE 102 at block 406 determines if a first RAT 112-1 transmission and a second RAT 112-2 transmission are to occur at substantially the same time. For example, the UE 102 can analyze scheduling information to determine if both a 4G LTE transmission slot and a 5G NR transmission slot have been scheduled and overlap in time. If a first scheduled RAT 112-1 transmission (slot) and a second RAT 112-2 transmission (slot) do not overlap in time, the UE 102 determines that uplink transmit power does not need to be shared for the current uplink transmission period. The current first RAT 112-1 or second RAT 112-2 uplink transmission is then allocated its required power within the $P_{RAT1}$ or $P_{RAT2}$ limits. However, if the UE 102 determines that a first RAT 112-1 transmission (slot) and a second RAT 112-2 transmission (slot) are to occur at the same time (e.g., their respective transmission slots overlap in time), the UE 102 at block 408 employs the data priority-based transmit power-sharing control mechanism 114.

The power-sharing control mechanism 114 at block 410 determines if the first RAT 112-1 transmission slot carries priority data. For example, in at least one embodiment, priority data information is defined for each RAT 112, and the power-sharing control mechanism 114 or another component of the UE 102 is configured with this priority data information. In at least one embodiment, the priority data information identifies types of data for each RAT 112 designated as priority data. Examples of data types designated as priority data include voice data, random access channel (RACH) data, user control information data (UCI), signaling radio bearer (SRB) data, data radio bearer (DRB) data, and the like. The priority data information for each of the RATs 112 may include the same and/or different data types. For example, priority data defined for 4G LTE can include voice over LTE (VoLTE), RACH, UCI, SRB, DRB, and the like. Priority data defined for 5G NR can include voice over NR (VoNR), RACH, UCI, SRB3, DRB, and the like. In some embodiments, priority is given to one or more data types in the first set of priority data defined for the first RAT 112-1 over one or more data types in the second set of priority data defined for the second RAT 112-2. However, in other embodiments, priority is given to one or more data types in the second set of priority data defined for the second RAT 112-2 over one or more data types in the first set of priority data defined for the first RAT 112-1. In at least one embodiment, the power-sharing control mechanism 114 can determine if a transmission slot carries priority data by determining the data type of the associated slot data and then comparing the data type to a configurable set of priority data types. If the data type of the slot data is included within the configurable set of priority data types, the power-sharing control mechanism 114 determines the data is priority data.

If the power-sharing control mechanism 114 determines that the first RAT 112-1 transmission slot includes priority data, the power-sharing control mechanism 114 at block 412 implements the first power-sharing mode 202 in which the first RAT 112-1 uplink transmission is given transmit power priority over the second RAT 112-2 uplink transmission. For example, the power-sharing control mechanism 114 allocates a first transmit power to the first RAT 112-1 up to $P_{RAT1}$ and allocates a second transmit power to the second RAT 112-2 based on a difference between the first transmit power and the maximum allowed transmit power for the UE, e.g., $P_{Max}-P_{RAT1}$. The first RAT 112-1 data and the second RAT 112-2 data are then transmitted in respective uplink signals according to their allocated transmit powers.

If the power-sharing control mechanism 114 at block 410 determines that the first RAT 112-1 transmission slot does not carry priority data, the power-sharing control mechanism 114 at block 414 determines if the second RAT 112-2 transmission slot carries priority data. If the second RAT 112-2 transmission slot does carry priority data, the power-sharing control mechanism 114 at block 416 implements the second power-sharing mode 204 in which the second RAT 112-2 uplink transmission is given transmit power priority over the first RAT 112-1 uplink transmission. For example, the power-sharing control mechanism 114 allocates a first transmit power to the second RAT 112-2 up to $P_{RAT2}$ and allocates a second transmit power to the first RAT 112-1 based on a difference between the first transmit power and the maximum allowed transmit power for the UE, e.g., $P_{Max}-P_{RAT2}$. The first RAT 112-1 data and the second RAT 112-2 data are then transmitted in respective uplink signals according to their allocated transmit powers. Control then returns to block 404, where the UE 102 determines if one or more additional transmission slots are scheduled.

If the power-sharing control mechanism 114 at block 414 determines that the second RAT 112-2 transmission slot does not carry priority data, the power-sharing control mechanism 114 at block 418 determines if an uplink DRB split bearer is configured. One example of a DRB split bearer is where data flow aggregation occurs across the eNB 110-1 and the gNB 110-2 via the core network 106. If a DRB split bearer is configured, the power-sharing control mechanism 114 at block 420 implements the third power-sharing mode 206 in which the maximum uplink transmit power $P_{Max}$ is allocated between the first RAT 112-1 and the second RAT 112-2 based on the data split. For example, if the first RAT 112-1 is carrying 100% of the data, then the power-sharing control mechanism 114 allocates transmit power to the first RAT 112-1 up to $P_{RAT1}$. If the second RAT 112-2 is carrying 100% of the data, then the power-sharing control mechanism 114 allocates transmit power to the second RAT 112-2 up to $P_{RAT2}$. However, if both the first RAT 112-1 and the second RAT 112-1 are scheduled to simultaneously transmit data having a non-priority data type, such as background or Internet data, then the power-sharing control mechanism 114 allocates power equally between the first RAT 112-1 and the second RAT 112-1 according to an equal power-sharing policy. For example, if $P_{Max}$ is 23 dBm, then the first RAT 112-1 is allocated 20 dBm (23 dBm−3 dBm) and the second RAT 112-2 is also allocated 20 dBm (23 dBm−3 dBm). The first RAT 112-1 data and the second RAT 112-2 data are then transmitted in respective uplink signals according to their allocated transmit powers. Control then returns to block 404, where the UE 102 determines if one or more additional transmission slots are scheduled.

If the power-sharing control mechanism 114 at block 418 determines that an uplink DRB split bearer is not configured, the power-sharing control mechanism 114 at block 422 implements the fourth power-sharing mode 208 in which uplink transmit power is split between the respective first RAT 112-1 and the second RAT 112-2 according to CLPC requirements of each RAT 112. For example, the first RAT base station 110-1 and the second RAT base station 110-2 can transmit a respective transmit power control command (TPC) to the UE first RAT 112-1 and the UE second RAT 112-2 when, for example, an uplink grant is allocated. The first RAT 112-1 and the second RAT 112-2 at the UE 102 utilize their received TPCs to either increase or decrease their power according to their respective $P_{RAT1}$ and $P_{RAT2}$ limits. However, the power-sharing control mechanism 114 ensures that the combined power of $P_{RAT1}$ and $P_{RAT2}$ does not exceed $P_{Max}$. Consider an example where $P_{Max\ is}$ 200 milliwatt (mW) (~23 dBm), and the first RAT 112-1 requires 150 mW while the second RAT 112-2 requires 200 mW. The total combined transmit power for the first RAT 112-1 and the second RAT 112-2 is 350 mW, which is 150 mW more than the $P_{Max}$. Therefore, power-sharing control mechanism 114 equally allocates the available transmit power to the first RAT 112-1 and the second RAT 112-2 as a function of $P_{Max}$ and their required transmit powers. For example, the first RAT 112-1 is allocated around 85 mW based on the following calculation (200*(150/350)) and the second RAT 112-2 is allocated around 115 mW based on the following calculation (200*(200/350)). The first RAT 112-1 data and the second RAT 112-2 data are then transmitted in respective uplink signals according to their allocated transmit powers. Control then returns to block 404, where the UE 102 determines if one or more additional transmission slots are scheduled.

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium can be in source code, assembly language code, object code, or another instruction format that is interpreted or otherwise executable by one or more processors.

A computer-readable storage medium includes any storage medium or combination of storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for managing transmit power for multiple radio access technologies (RATs) at a user equipment (UE), the method comprising:
   determining whether a first scheduled transmission using a first RAT of the UE overlaps in time with at least a second scheduled transmission using at least a second RAT of the UE;
   responsive to the first and second scheduled transmissions overlapping in time, allocating transmit power to the first RAT and the second RAT based on a first data type of a first set of data associated with the first scheduled transmission and a second data type of a second set of data associated the second scheduled transmission; and
   configuring, based on the allocated transmit power, a transmitter of the UE with a first transmit power level for the first scheduled transmission using the first RAT and a second transmit power level for second scheduled transmission using the second RAT.

2. The method of claim 1, wherein allocating transmit power to the first RAT and the second RAT comprises:
   determining whether at least one of the first data type and the second data type is designated as a priority data type; and
   responsive to determining that at least one of the first data type and the second data type is designated as a priority data type, allocating transmit power to the first RAT and the second RAT according to a power transmit priority associated with the at least one of the first data type and the second data type.

3. The method of claim 2, further comprising:
   responsive to the first data type being designated as a lower priority than the second data type, allocating transmit power to the first RAT and the second RAT by:
   determining whether the second data type is designated as a higher priority than the first data type; and
   responsive to the second data type being designated as a higher priority:
   determining a first transmit power required by the second RAT;
   allocating the transmit power to the second RAT;
   determining a second transmit power available for the first RAT based on the first transmit power allocated to the second RAT; and
   allocating the second transmit power to the first RAT.

4. The method of claim 1, wherein allocating transmit power to the first RAT and the second RAT comprises:
   determining whether the first data type is designated as a higher priority than the second data type; and
   responsive to the first data type being designated as a higher priority:
   determining a first transmit power required by the first RAT;
   allocating the first transmit power to the first RAT;
   determining a second transmit power available for the second RAT based on the first transmit power allocated to the first RAT; and
   allocating the second transmit power to the second RAT.

5. The method of claim 4, further comprising:
   determining the first transmit power based on a maximum allowed transmit power for the UE and a maximum allowed transmit power for the first RAT.

6. The method of claim 5, further comprising:
   determining the second transmit power based on a difference between the first transmit power and the maximum allowed transmit power for the UE.

7. The method of claim 1, wherein allocating transmit power to the first RAT and the second RAT comprises:
   determining whether the second data type is designated as a higher priority than the first data type; and
   responsive to the second data type being designated as a higher priority:
   determining a first transmit power required by the second RAT;
   allocating the first transmit power to the second RAT;
   determining a second transmit power available for the first RAT based on the first transmit power allocated to the second RAT; and
   allocating the second transmit power to the first RAT.

8. The method of claim 7, further comprising:
determining the first transmit power based on a maximum allowed transmit power for the UE and a maximum allowed transmit power for the second RAT.

9. The method of claim 8, further comprising:
determining the second transmit power based on a difference between the first transmit power and the maximum allowed transmit power for the UE.

10. The method of claim 1, wherein allocating transmit power to the first RAT and the second RAT comprises:
determining that the first data type and the second data type are designated as non-priority data types; and
responsive to the first and second data types being designated as non-priority data types, allocating transmit power to the first RAT and the second RAT according to an equal power-sharing policy.

11. The method of claim 10, wherein allocating transmit power to first RAT and the second RAT according to the equal power-sharing policy is further responsive to the first RAT and the second RAT being employed in a split bearer configuration.

12. The method of claim 10, wherein allocating transmit power to the first RAT and the second RAT according to the equal power-sharing policy comprises:
equally allocating a same specified amount of transmit power to each of the first RAT and the second RAT based on a maximum transmit power set for the UE.

13. The method of claim 10, wherein allocating transmit power to the first RAT and the second RAT according to the equal power-sharing policy comprises:
determining that only the first scheduled transmission comprises data to be transmitted; and
responsive to only the first scheduled transmission comprises data to be transmitted, allocating, based on a maximum transmit power set for the UE, a total amount of transmit power to the first RAT required for transmitting the first scheduled transmission.

14. The method of claim 10, wherein allocating transmit power to the first RAT and the second RAT according to the equal power-sharing policy comprises:
determining that only the second scheduled transmission comprising data to be transmitted; and
responsive to only the second scheduled transmission comprising data to be transmitted, allocating, based on a maximum transmit power set for the UE, a total amount of transmit power to the second RAT required for transmitting the second scheduled transmission.

15. The method of claim 1, wherein allocating transmit power to the first RAT and the second RAT comprises:
determining that the first data type and the second data type are designated as non-priority data types; and
responsive to the first and second data types being designated as non-priority data types, allocating transmit power to the first RAT and the second RAT according to closed loop power control requirements of the first RAT and the second RAT, respectively.

16. The method of claim 15, wherein allocating transmit power to the first RAT further comprises:
allocating the transmit power to the first RAT based on a maximum transmit power set for the UE and a ratio of a first transmit power required for the first scheduled transmission to a second transmit power required for the second scheduled transmission.

17. The method of claim 15, wherein allocating transmit power to the second RAT further comprises:
allocating the transmit power to the second RAT based on a maximum transmit power set for the UE and a ratio of a first transmit power required for the second scheduled transmission to a second transmit power required for the first scheduled transmission.

18. The method of claim 1, wherein the first RAT is a Fourth Generation Long-Term Evolution RAT and the second RAT is a Fifth Generation New Radio RAT.

19. The method of claim 1, wherein allocating the transmit power to the first RAT and the second RAT comprises:
allocating the transmit power to the first RAT and the second RAT according to a transmit power sharing mode selected from a plurality of transmit power sharing modes based on the first data type of the first set of data associated with the first scheduled transmission and the second data type of the second set of data associated the second scheduled transmission, wherein each transmit power sharing mode allocates a different power level configuration to the first RAT and the second RAT.

20. A user equipment, comprising:
one or more radio frequency (RF) modems implementing at least a first radio access technology (RAT) and a second RAT, the one or more RF modems configured to wirelessly communicate with at least one mobile network operator;
a processor coupled to the one or more RF modems; and
at least one memory storing executable instructions, the executable instructions configured to manipulate at least one of the processor and the one or more RF modems to:
determine whether a first scheduled transmission using the first RAT overlaps in time with at least a second scheduled transmission using at least the second RAT;
responsive to the first and second scheduled transmissions overlapping in time, allocate transmit power to the first RAT and the second RAT based on a first data type of a first set of data associated with the first scheduled transmission and a second data type of a second set of data associated the second scheduled transmission; and
configure, based on the allocated transmit power, a transmitter of the user equipment with a first transmit power level for the first scheduled transmission using the first RAT and a second transmit power level for second scheduled transmission using the second RAT.

21. The user equipment of claim 20, wherein the executable instructions further comprise executable instructions to manipulate at least one of the processor or the one or more RF modems to:
determine whether at least one of the first data type and the second data type is designated as a priority data type; and
responsive to a determination that at least one of the first data type and the second data type is designated as a priority data type, allocate transmit power to the first RAT and the second RAT according to a power transmit priority associated with the at least one of the first data type and the second data type.

* * * * *

UNITED STATES PATENT AND TRADEMARK OFFICE
CERTIFICATE OF CORRECTION

PATENT NO. : 12,160,881 B2
APPLICATION NO. : 17/005706
DATED : December 3, 2024
INVENTOR(S) : Madhusudan Kinthada Venkata et al.

It is certified that error appears in the above-identified patent and that said Letters Patent is hereby corrected as shown below:

In the Claims

At Column 14 Line 02, please correct "associated the second" to be --associated with the second--

At Column 14 Line 06, please correct "for second scheduled" to be --for the second scheduled--

At Column 15 Line 18, please correct "power to first RAT" to be --power to the first RAT--

At Column 15 Line 34-35, please correct "transmission comprises data" to be --transmission comprising data--

At Column 16 Line 18, please correct "associated the second" to be --associated with the second--

At Column 16 Line 42, please correct "associated the second" to be --associated with the second--

Signed and Sealed this
Fourteenth Day of October, 2025

John A. Squires
*Director of the United States Patent and Trademark Office*